United States Patent [19]

Sukigara

[11] Patent Number: 5,133,610
[45] Date of Patent: Jul. 28, 1992

[54] DOCUMENT PROCESSING APPARATUS WITH POWER DETECTION AND MODE SETTING DISPLAYED

[75] Inventor: Akihiko Sukigara, Tokyo, Japan

[73] Assignee: Canon Kabushiki Kaisha, Tokyo, Japan

[21] Appl. No.: 688,315

[22] Filed: Apr. 22, 1991

[30] Foreign Application Priority Data

Apr. 27, 1990 [JP] Japan .................. 2-110520

[51] Int. Cl.$^5$ ............................. B68B 3/22
[52] U.S. Cl. ...................... 400/54; 400/83; 400/76; 395/112
[58] Field of Search ............ 400/54, 76, 83; 395/425, 112, 275; 364/710.09

[56] References Cited

U.S. PATENT DOCUMENTS

| | | | |
|---|---|---|---|
| 4,179,732 | 12/1979 | Khan et al. | 395/275 |
| 4,282,583 | 8/1981 | Khan et al. | 395/425 |
| 4,503,428 | 3/1985 | Hashimoto et al. | 364/710.09 |
| 4,525,780 | 6/1985 | Bratt et al. | 395/425 |
| 4,557,615 | 12/1988 | Ueno | 400/54 |
| 4,804,278 | 2/1989 | Gotou et al. | 400/54 |
| 4,840,499 | 6/1989 | Sasaki | 400/83 |
| 4,891,769 | 1/1990 | Tasaki | 400/54 |
| 4,955,735 | 9/1990 | Sakuragi | 400/83 |

FOREIGN PATENT DOCUMENTS

| | | | |
|---|---|---|---|
| 0129540 | 11/1978 | Japan | 400/83 |
| 0220883 | 10/1986 | Japan | 400/54 |
| 0160259 | 7/1987 | Japan | 400/54 |
| 0633982 | 1/1988 | Japan | 400/54 |
| 0246268 | 10/1988 | Japan | 400/54 |
| 0027971 | 1/1989 | Japan | 400/54 |

OTHER PUBLICATIONS

"Format Control Functions" IBM Tech. Disclosure Bulletin vol. 25, No. 1, Jun. 1982 pp. 217-220.

*Primary Examiner*—Eugene H. Eickholt
*Attorney, Agent, or Firm*—Fitzpatrick, Cella, Harper & Scinto

[57] ABSTRACT

A document processing apparatus includes a keyboard for inputting character data, a display unit for displaying the character data input by the keyboard, a mode setting device for setting a plurality of kinds of mode information, a detector for detecting the turning on of a power supply of the apparatus, and a central processing unit for controlling the displaying of the mode information set by the mode setting device on the display when the detector detects the turning on of the power supply of the apparatus.

12 Claims, 4 Drawing Sheets

DOCUMENT PROCESSING APPARATUS WITH POWER DETECTION AND MODE SETTING DISPLAYED

BACKGROUND OF THE INVENTION

1. Field of the Invention

This invention relates to a document processing apparatus, such as an electronic typewriter or the like, which does not have a display unit dedicated for mode display.

2. Description of the Related Art

Heretofore, in a document processing apparatus, such as an electronic typewriter or the like, various kinds of modes can be selected by a single mode selection key as described in, for example, U.S. Pat. No. 4,527,917 (reference numeral 18 in FIG. 1 of this patent), and information of the selected mode can be displayed on the picture surface of a display unit.

That is, in a conventional document processing apparatus, such as a typewriter or the like, which displays mode information, a specific key for mode display is provided, and mode display is performed only by depressing the specific key.

In the above-described conventional apparatus, however, since the specific key for mode display must be depressed every time mode information is to be confirmed, it is troublesome to confirm mode information.

SUMMARY OF THE INVENTION

It is an object of the present invention to overcome the problems of the prior art.

It is another object of the present invention to provide a document processing apparatus which displays mode information without the necessity to depress a specific key for mode display.

These and other objects of the present invention are accomplished, according to one aspect, by a document processing apparatus comprising inputting means for inputting character data, displaying means for displaying the character data input by the inputting means, setting means for setting a plurality of kinds of mode information, detecting means for detecting the turning on of a power supply of the apparatus, and controlling means for controlling the displaying of the mode information set by the setting means on the displaying means when the detecting means detects that the turning on of the power supply of the apparatus.

According to another aspect, the present invention which achieves these objectives relates to a document processing apparatus comprising inputting means for inputting character data, storing means for storing the character data input by the inputting means, displaying means for displaying the character data stored in the storing means, printing means for printing the character data stored in the storing means, setting means for setting a plurality of kinds of mode information, determining means for determining whether all the character data stored in the storing means have been printed, and controlling means for displaying the mode information set by the setting means on the displaying means when the determining means determines that all the character data stored in the storing means has been printed.

According to still another aspect, the present invention which achieves these objectives relates to a document processing apparatus comprising inputting means for inputting character data, storing means for storing the character data input by the inputting means, displaying means for displaying the character data stored in the storing means, setting means for setting a plurality of kinds of mode information, determining means for determining whether all the character data stored in the storing means has been cancelled, and controlling means for controlling the displaying of the mode information set by the setting means on the displaying means when the determining means determines that all the character data stored in the storing means has been cancelled.

The displaying means comprises a liquid crystal display device. In addition, the controlling means controls the displaying of mode information subjected to initial setting by the setting means on the displaying means. Further, the controlling means controls the displaying of mode information set by the setting means on the displaying means before the turning on of the power supply.

These and other objects, features, and advantages of the present invention will become clear when reference is made to the following detailed description of preferred embodiments of the present invention, and to the accompanying drawings.

DETAILED DESCRIPTION OF THE PREFERRED EMBODIMENTS

An explanation will now be provided of the preferred embodiments of the present invention with reference to the drawings.

Figure 1:
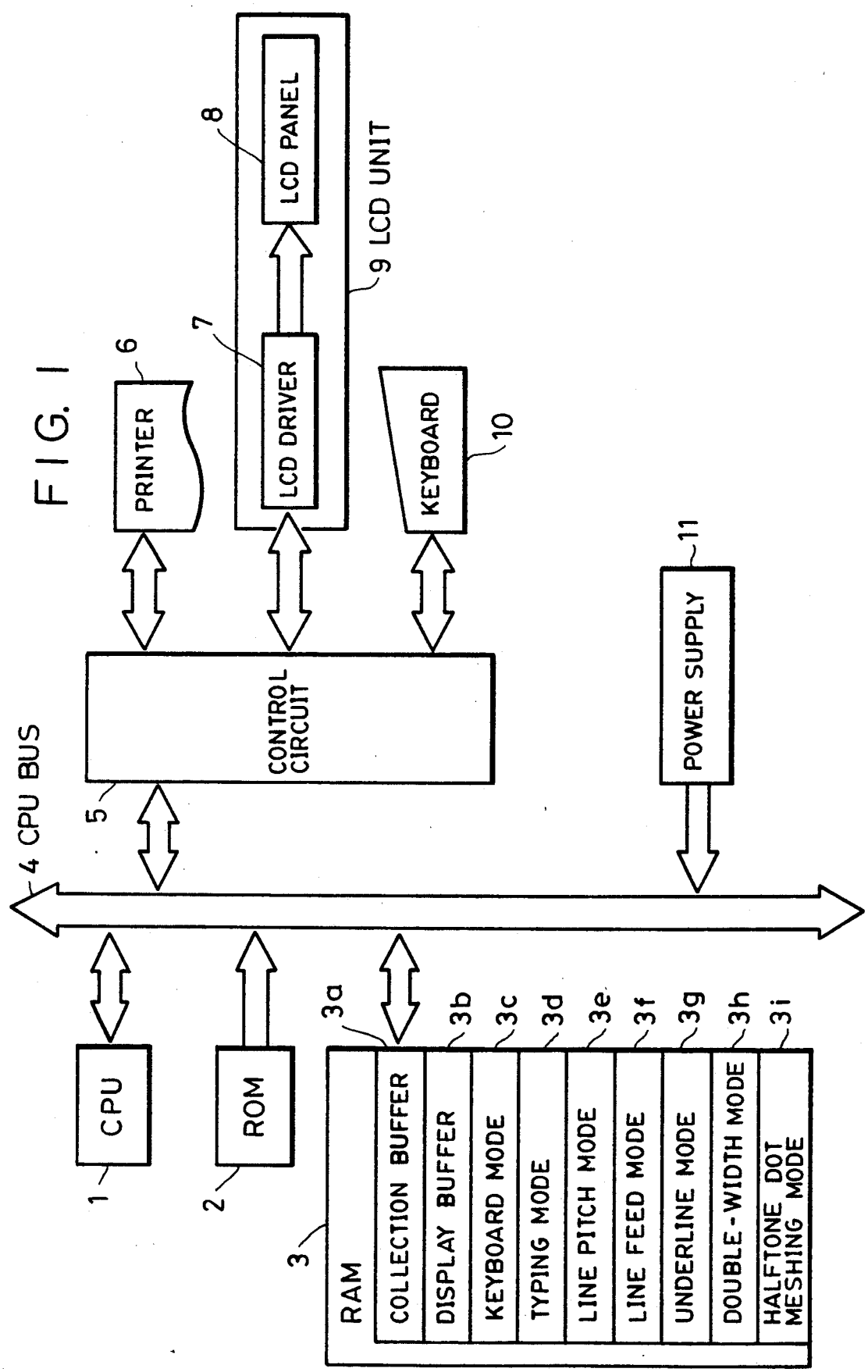
FIG. 1 is a block diagram showing the configuration of an embodiment of the present invention.

FIG. 1 shows the configuration of an embodiment of the present invention. In FIG. 1, a CPU (central processing unit) 1 controls the entire apparatus. A ROM (read-only memory) 2 stores programs for the CPU 1.

A RAM (random access memory) 3 temporarily stores data, and includes a collection buffer 3a for storing input character codes for one line, a display buffer 3b for displaying latest 16 input characters, a keyboard mode area 3c, a typing mode area 3d, a line pitch mode area 3e, a line feed mode area 3f, an underline mode area 3g, a double-width mode area 3h, and a halftone dot meshing area 3i. CPU bus 4 transmits address data control signals. A control circuit 5 performs the transmission/reception of signals and data with a printer 6, an LCD (liquid-crystal display) driver 7 and a keyboard 10. The printer 6 is provided in a printing device. The LCD driver 7 controls an LCD panel 8 for performing display. An LCD unit 9 includes the LCD driver 7 and the LCD panel 8. The keyboard 10 serves as an input device. FIG. 1 also shows a power supply 11.

Figure 4:
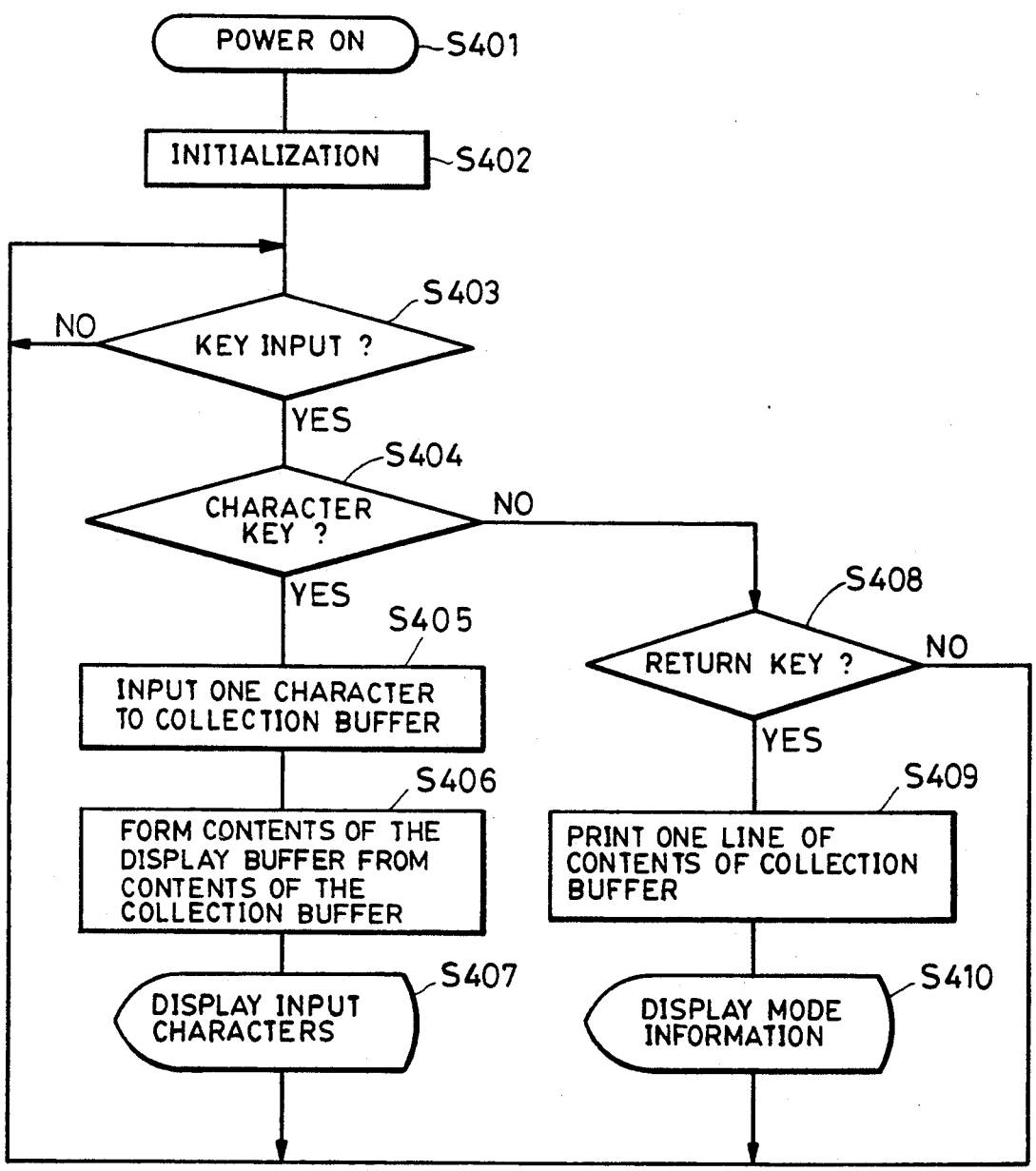
FIG. 4 is a flowchart showing a control procedure stored in a ROM 2 in one embodiment of the present invention.

FIG. 4 is a flowchart showing a control procedure stored in the ROM 2. Unless otherwise specified, the CPU 1 performs or controls the performing of the steps shown in FIG. 4.

When the power supply 11 has been turned on at step S401, initialization processing of the printer 6, the LCD unit 9, the keyboard 10, the RAM 3 and the like is performed at step S402. At step S403, the apparatus awaits a key input. When a key input has been performed, at step S404, the CPU 1 checks whether or not the input key is a character key. If the result of the check is affirmative, one character is input to the collection buffer 3a at step S405. At step S406, the CPU 1 forms the contents of the display buffer 3b from the contents of the collection buffer 3a. Specifically, the CPU 1 stores data, representing the character input by the keyboard 10 and stored in the collection buffer 3a, in the display buffer 3b. At step S407, the input character is displayed. The process then returns to step S403, where a key input is awaited.

If the result of check at step S404 is negative, the process branches to step S408, where the CPU 1 checks whether or not the input key is a return key. If the result of the check is negative, the process returns to step S403, where a key input is awaited again. If the result of check at step S408 is affirmative, the process proceeds to step S409, where the contents of the collection buffer are printed only for one line. Subsequently, at step S410, mode information is displayed. The process then proceeds to step S403, where a key input is awaited.

Figure 2:
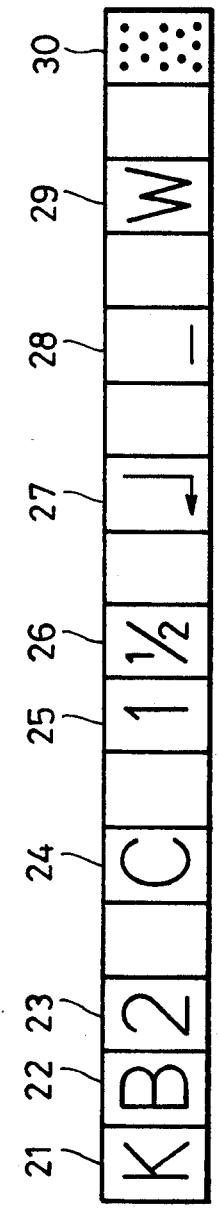
FIG. 2 shows an example of mode display in the embodiment shown in FIG. 1.

FIG. 2 shows an example of the display of mode information. In FIG. 2, reference numerals 21, 22 and 23 represent the portion of LCD panel 8 that displays a keyboard mode, reference numeral 24 represents the portion of LCD panel 8 that displays a typing mode, and reference numerals 25 and 26 represent the portion of LCD panel 8 that displays a line pitch mode. Further, reference numerals 27, 28, 29 and 30 represent the portion of LCD panel 8 that displays a line feed mode, an underline mode, a double-width mode and a halftone dot meshing mode, respectively. In addition, FIG. 2 also shows one particular example of the characters that are used to represent these different modes on the LCD panel 8.

Figure 3:
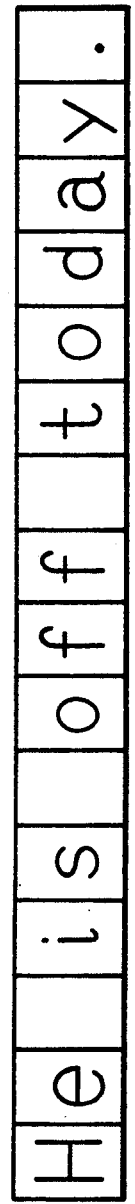
FIG. 3 shows an example of the display of input characters in the embodiment shown in FIG. 1.

FIG. 3 shows an example of the display of input characters on the LCD panel 8. Key inputs are displayed as "He is off today".

Another embodiment

Figure 5:
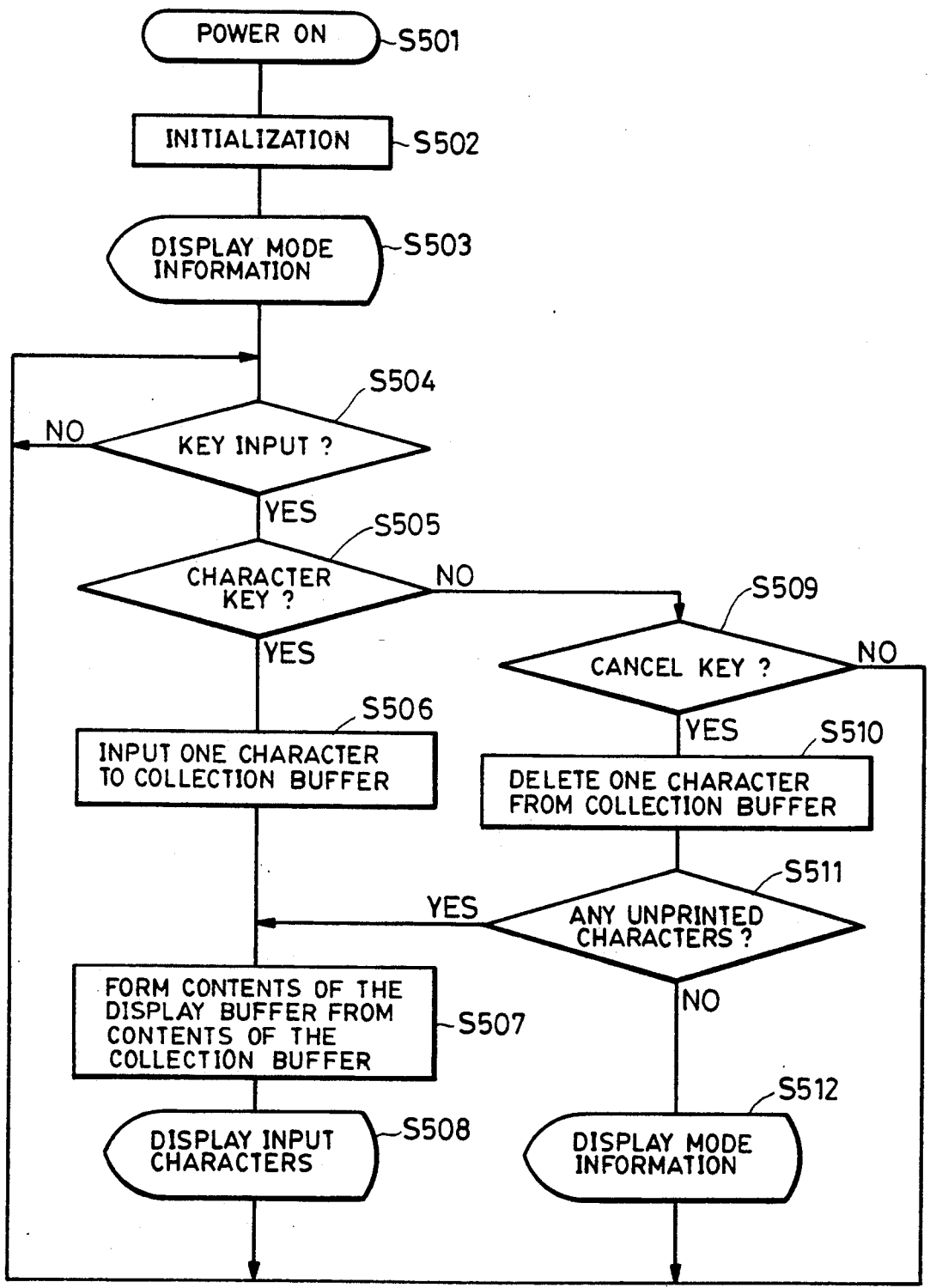
FIG. 5 is a flowchart showing a control procedure stored in the ROM 2 in another embodiment of the present invention.

FIG. 5 is a flowchart showing another control procedure stored in the ROM 2. Unless otherwise specified, the CPU 1 performs or controls the performing of the steps shown in FIG. 5.

When the power supply 11 has been turned on at step S501, initialization processing of the printer 6, the LCD unit 9, the keyboard 10, the RAM 3 and the like is performed at step S502. At step S503, mode information is displayed. The mode information to be displayed may be the mode information representing an initial setting, or the mode information set before turning on the power supply 11. At step S504, the apparatus awaits a key input. When a key input has been performed, the CPU 1 checks whether or not the input key is a character key at step S505. If the result of the check is affirmative, only one character is stored in the collection buffer at step S506. At step S507, the CPU 1 forms the contents of the display buffer 3b from the contents of the collection buffer 3a. Specifically, the CPU 1 stores data, representing the character input by the keyboard 10 and stored in the collection buffer 3a, in the display buffer 3b. At step S508, the input character is displayed. The process then returns to step S504, where a key input is awaited.

If the result of check at step S505 is negative, the process proceeds to step S509, where the CPU 1 checks whether or not the input key is a cancel key. If the result of the check is negative, the process returns to step S504, where a key input is awaited. If the result of the check at step S509 is affirmative, at step S510, only one character is deleted from the collection buffer. Subsequently, at step S511, the CPU 1 checks whether there are any unprinted characters in the collection buffer after deleting the one character. If the result of the check is affirmative, the process proceeds to step S507. If the result of the check is negative, the process proceeds to step S512, where mode information is displayed. The process then returns to step S504, where a key input is awaited.

The individual components represented by the blocks shown in FIG. 1 are well known in the document processing art and their specific construction and operation is not critical to the invention or the best mode for carrying out the invention. Moreover, the operations illustrated in FIGS. 4 and 6 can be easily programmed into well known central processing units by persons of ordinary skill in the art and since such programming per se is not part of the invention, no further description thereof is deemed necessary.

As explained above, according to the present invention, the system is arranged so that mode information is displayed when the power supply has been turned on, when all the key input characters have been printed, and when all the key input characters have been cancelled. Hence, mode information is easily confirmed.

What is claimed is:

1. A document processing apparatus comprising:
inputting means for inputting character data;
displaying means for displaying the character data input by said inputting means;
setting means for setting a plurality of kinds of mode information;
detecting means for detecting the turning on of a power supply of the apparatus; and
controlling means for controlling the displaying of the mode information set by said setting means on said displaying means when said detecting means detects the turning on of the power supply of said apparatus.

2. A document processing apparatus according to claim 1, wherein said displaying means comprises a liquid crystal display device.

3. A document processing apparatus according to claim 1, wherein said controlling means controls the displaying of mode information set by said setting means on said displaying means on said displaying means.

4. A document processing apparatus according to claim 1, wherein said controlling means controls the displaying of mode information set by said setting means on said displaying means before the turning on of the power supply.

5. A document processing apparatus comprising:
inputting means for inputting character data;
storing means for storing the character data input by said inputting means;
displaying means for displaying the character data stored in said storing means;
printing means for printing the character data stored in said storing means;

setting means for setting a plurality of kinds of mode information;

determining means for determining whether all the character data stored in said storing means has been printed; and controlling means for displaying mode information set by said setting means on said displaying means when said determining means determines that all the character data stored in said storing means has been printed.

6. A document processing apparatus according to claim 5, wherein said displaying means comprises a liquid crystal display device.

7. A document processing apparatus according to claim 5, wherein said controlling means controls the displaying of mode information subjected to initial setting by said setting means on said displaying means.

8. A document processing apparatus according to claim 5, wherein said controlling means controls the displaying of mode information set by said setting means on said displaying means before said printing by said printing means.

9. A document processing apparatus comprising:
inputting means for inputting character data;
storing means for storing the character data input by said inputting means;
displaying means for displaying the character data stored in said storing means;
setting means for setting a plurality of kinds of mode information;
determining means for determining whether all the character data stored in said storing means has been cancelled; and
controlling means for controlling the displaying of the mode information set by said setting means on said displaying means when said determining means determines that all the character data stored in said storing means has been cancelled.

10. A document processing apparatus according to claim 9, wherein said displaying means comprises a liquid crystal display device.

11. A document processing apparatus according to claim 9, wherein said controlling means controls the displaying of mode information subjected to initial setting by said setting means on said displaying means.

12. A document processing apparatus according to claim 9, wherein said controlling means controls the displaying of mode information set by said setting means on said displaying means before the cancellation of the character data stored in said storing means.

* * * * *

UNITED STATES PATENT AND TRADEMARK OFFICE
CERTIFICATE OF CORRECTION

PATENT NO. : 5,133,610
DATED : July 28, 1992
INVENTOR(S) : Akihiko Sukigara It is certified that error appears in the above-identified patent and that said Letters Patent is hereby corrected as shown below:

On title page, item
[56] References Cited
    U.S. PATENT DOCUMENTS

Line 5, change "4,557,615 12/1988 Ueno" to
--4,557,615 12/1985 Ueno--.

[56] References Cited
    FOREIGN PATENT DOCUMENTS

Line 4, change "0633982 1/1988 Japan" to
--63-3982 1/1988 Japan--.

COLUMN 4

Line 54, delete "on said displaying means" (first occurrence).

Signed and Sealed this

Fourteenth Day of September, 1993

Attest:

BRUCE LEHMAN

*Attesting Officer*    *Commissioner of Patents and Trademarks*